United States Patent
Rock

(10) Patent No.: US 10,811,719 B2
(45) Date of Patent: Oct. 20, 2020

(54) FUEL CELL STACK ALIGNMENT SYSTEM AND METHOD OF ASSEMBLING A FUEL CELL STACK

(71) Applicant: GM Global Technology Operations LLC, Detroit, MI (US)

(72) Inventor: Jeffrey A. Rock, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 96 days.

(21) Appl. No.: 16/059,600

(22) Filed: Aug. 9, 2018

(65) Prior Publication Data

US 2020/0052320 A1     Feb. 13, 2020

(51) Int. Cl.
| | | |
|---|---|---|
| H01M 8/2475 | (2016.01) | |
| H01M 8/0247 | (2016.01) | |
| H01M 8/0258 | (2016.01) | |
| H01M 8/247 | (2016.01) | |

(52) U.S. Cl.
CPC ....... *H01M 8/2475* (2013.01); *H01M 8/0247* (2013.01); *H01M 8/0258* (2013.01); *H01M 8/247* (2013.01)

(58) Field of Classification Search
CPC ............. H01M 8/2475; H01M 8/0247; H01M 8/0258; H01M 8/247
See application file for complete search history.

(56) References Cited

U.S. PATENT DOCUMENTS

| | | | |
|---|---|---|---|
| 6,358,641 B1* | 3/2002 | Mease | H01M 8/0247 429/470 |
| 7,794,890 B2 | 9/2010 | Rock et al. | |
| 2014/0113212 A1* | 4/2014 | Niezelski | H01M 8/0271 429/468 |
| 2016/0226092 A1* | 8/2016 | Nishiyama | H01M 8/2475 |
| 2018/0351182 A1* | 12/2018 | Hood | H01M 8/04552 |

* cited by examiner

*Primary Examiner* — Bethany L Martin
(74) *Attorney, Agent, or Firm* — Quinn IP Law

(57) ABSTRACT

A fuel cell stack alignment system includes an alignment guide bar for positioning a plurality of stack components. Each of the stack components has an alignment slot and a spacing slot. A first alignment portion and a second alignment portion of the alignment guide bar has a shape that is complimentary to the shape of the alignment slot of each of the stack components. Abutting engagement between one of the first or second alignment portions and the alignment slot aligns each respective stack component in a respective assembly position. The other of the first and second alignment portions of each respective stack component is disposed within the spacing slot. The spacing slot has a shape that is larger than the first and second alignment portions, to provide a gap between the stack components and the alignment guide bar.

20 Claims, 4 Drawing Sheets

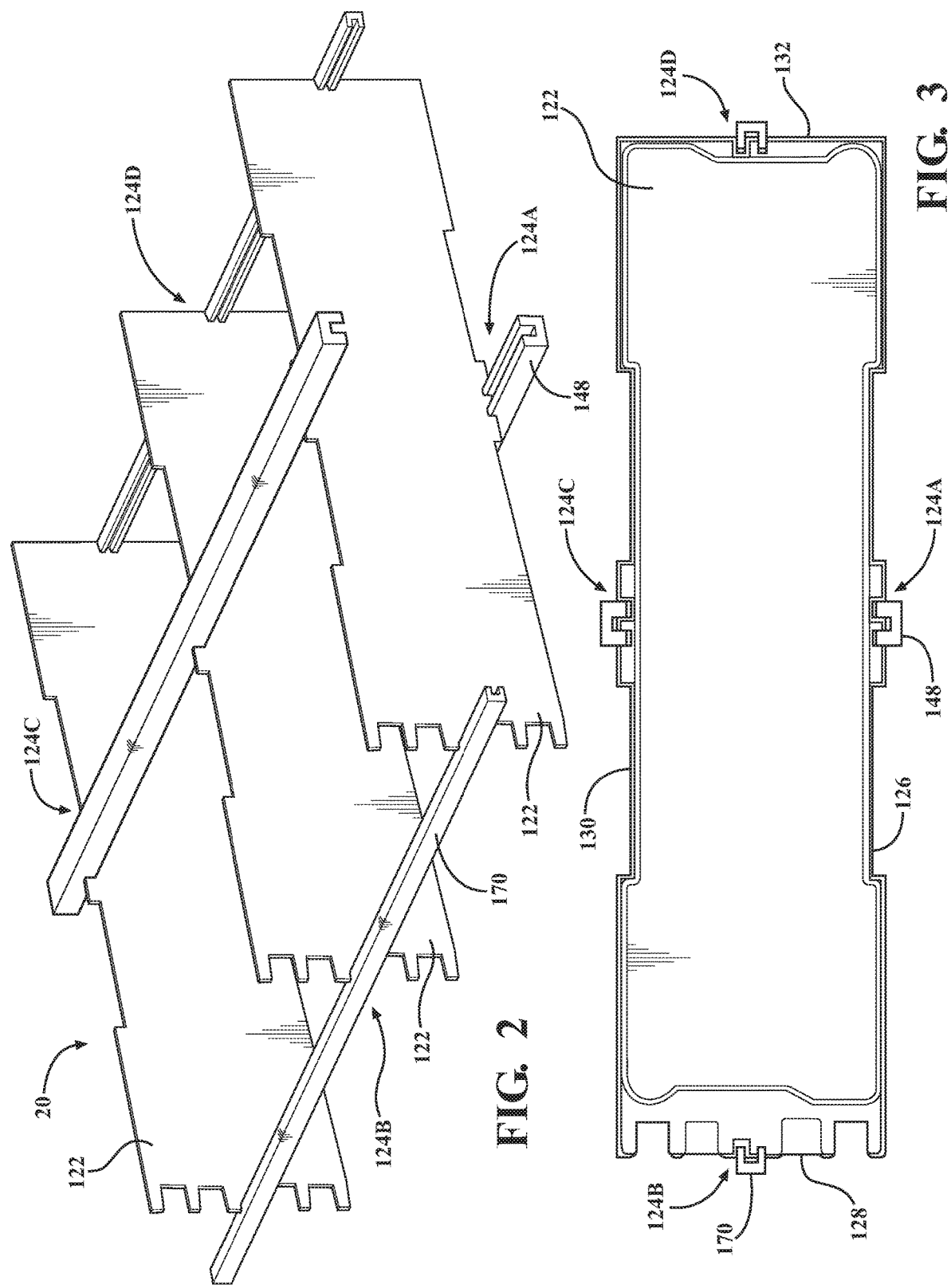

FUEL CELL STACK ALIGNMENT SYSTEM AND METHOD OF ASSEMBLING A FUEL CELL STACK

INTRODUCTION

The disclosure generally relates to a fuel cell stack alignment system for assembling a fuel cell stack.

Fuel cell stacks include a plurality of stack components, which are arranged in a pre-defined sequence, and must be precisely positioned relative to each other before being compressed and secured together. The individual stack components are very thin, and often exhibit a non-planar form prior to being compressed. During assembly, the stack components are positioned in their pre-defined sequence. An alignment system is used to initially position the stack components in their pre-defined sequence relative to each other, and maintain their respective position during compression. The alignment system should maintain the proper position of the stack components during compression, as the individual stack components change from their original non-planar shape into a planar form during compression.

SUMMARY

A fuel cell stack alignment system is provided. The fuel cell stack alignment system includes a plurality of stack components, with each of the plurality of stack components having a first edge defining a first alignment slot having a shape. A first alignment guide bar includes a first alignment portion having a shape. The shape of the first alignment portion of the first alignment guide bar is complimentary to the shape of the first alignment slot of each of the plurality of stack components, such that abutting engagement between the first alignment portion of the first alignment guide bar and the first alignment slot aligns each respective stack component in a respective assembly position relative to the other of the plurality of stack components. The interaction between the first alignment slot and the first alignment portion is disposed along the first edge of the stack components, making it easy to withdraw the first alignment portion from the first alignment slot without binding between the stack components and the first alignment portion of the first alignment guide bar. Additionally, because the interaction between the first alignment slot and the first alignment portion is disposed over a short distance along the first edge of the stack components, the stack components easily move into their proper assembly position.

In another aspect of the fuel cell stack alignment system, the first edge of each of the plurality of stack components defines a first spacing slot having a shape. The first spacing slot is laterally offset across a first centerline from the first alignment slot.

In another aspect of the fuel cell stack alignment system, the first alignment guide bar includes a second alignment portion having a shape. The second alignment portion of the first alignment guide bar is laterally offset across the first centerline from the first alignment portion of the first alignment guide bar. The shape of the second alignment portion is substantially identical to the shape of the first alignment portion.

In another aspect of the fuel cell stack, the shape of the first spacing slot of each of the plurality of stack components is larger than the shape of the first alignment portion and the shape of the second alignment portion of the first alignment guide bar. The larger shape of the first spacing slot provides a gap between each respective one of the plurality of stack components and the one of the first alignment portion and the second alignment portion of the first alignment guide bar disposed within the first spacing slot.

In one aspect of the fuel cell stack alignment system, one of the first alignment portion and the second alignment portion of the first alignment guide bar is disposed within the first alignment slot of each respective one of the plurality of stack components in abutting engagement to align the plurality of stack components relative to each other. The other of the first alignment portion and the second alignment portion of the first alignment guide bar is disposed within the first spacing slot of each respective one of the plurality of stack components in non-contacting engagement to provide an insulation air-gap therebetween.

In one embodiment of the fuel cell stack alignment system, the plurality of stack components are arranged in an alternating sequence such that the first alignment slots of adjacent stack components alternate between engagement within the first alignment portion and engagement within the second alignment portion of the first alignment guide bar.

In one embodiment of the fuel cell stack alignment system, each of the plurality of stack components includes a second edge defining a second alignment slot having a shape. A second alignment guide bar includes a first alignment portion having a shape, and a second alignment portion having a shape. The shape of the first alignment portion and the shape of the second alignment portion of the second alignment guide bar are substantially identical. The second alignment portion of the second alignment guide bar is laterally offset across a second centerline from the first alignment portion of the second alignment guide bar. The shape of the first alignment portion and the shape of the second alignment portion of the second alignment guide bar are complimentary to the shape of the second alignment slot of each of the plurality of stack components, such that abutting engagement between one of the first alignment portion or the second alignment portion and the second alignment slot aligns each respective stack component in their respective assembly position relative to the other of the plurality of stack components.

In another aspect of the fuel cell stack alignment system, the second edge of each of the plurality of stack components defines a second spacing slot having a shape. The second spacing slot is laterally offset across the second centerline from the second alignment slot. The shape of the second spacing slot of each of the plurality of stack components is larger than the shape of the first alignment portion and the shape of the second alignment portion of the second alignment guide bar to provide a gap between each respective one of the plurality of stack components and the one of the first alignment portion and the second alignment portion of the second alignment guide bar disposed within the second spacing slot.

In one embodiment of the fuel cell stack alignment system, the first edge and the second edge of each respective one of the stack components are generally opposing edges of that respective stack component, and are disposed in a generally parallel relationship with each other. In another embodiment, the first edge and the second edge of each respective one of the stack components are generally adjacent edges of that respective stack component, and are disposed in a generally perpendicular relationship relative to each other. In another embodiment, the fuel cell stack includes multiple alignment systems, with a first pair of the alignment systems disposed opposite each other in a parallel relationship, and a second pair of alignment systems disposed opposite each other in a parallel relationship, and generally perpendicular to the first pair of the alignment systems. In yet another embodiment, the fuel cell stack only includes a single alignment system.

In one aspect of the fuel cell stack alignment system, the first alignment slot and the first spacing slot are each recessed into the first edge of each of the plurality of stack components a respective depth extending perpendicular to the first edge. The depth of the first spacing slot is greater than the depth of the first alignment slot. In another aspect of the fuel cell stack alignment system, the first alignment slot and the first spacing slot each include a respective width extending parallel with the first edge. The width of the first spacing slot is greater than the width of the first alignment slot.

A method of assembling a fuel cell stack is also provided. The method includes providing a plurality of stack components, with each of the plurality of stack components having a first edge defining a first alignment slot having a shape, and a first spacing slot having a shape. One of a first alignment portion or a second alignment portion of a first alignment guide bar is positioned within the first alignment slot of each of the plurality of stack components, such that the other of the first alignment portion and the second alignment position of the first alignment guide bar is positioned within the first spacing slot. The shape of the first alignment portion and the second alignment portion of the first alignment guide bar is complimentary to the shape of the first alignment slot of each of the plurality of stack components, such that abutting engagement between one of the first alignment portion or the second alignment portion of the first alignment guide bar and the first alignment slot aligns each respective stack component in a respective assembly position relative to the other of the plurality of stack components to form a stack. The shape of the first spacing slot of each of the plurality of stack components is larger than the shape of the first alignment portion and the shape of the second alignment portion of the first alignment guide bar. The larger size of the shape of the first spacing slot provides an air gap between each respective one of the plurality of stack components and the one of the first alignment portion and the second alignment portion of the first alignment guide bar positioned within the first spacing slot.

In one aspect of the method of assembling the fuel cell stack, the first alignment guide bar is removed from the formed stack after the plurality of stack components are positioned in the assembly position. In one embodiment, the first alignment guide bar is removed after compressing the fuel cell stack to approximately 90% of its final assembly position, after which the fuel cell stack is compressed the final approximate 10% to its final assembly position without the first alignment guide bar.

In another aspect of the method of assembling the fuel cell stack, one of a first reinforcing projection and a second reinforcing projection of a first reinforcing rib is positioned into the first alignment slot of each respective one of the plurality of stack components to secure the stack after assembly. The other of the first reinforcing projection and the second reinforcing projection of the first reinforcing rib is positioned within the first spacing slot of each respective one of the plurality of stack components.

In another aspect of the method of assembling the fuel cell stack, a potting compound is installed into at least one of the first alignment slot and the first spacing slot of each of the plurality of stack components prior to positioning the first reinforcing projection and the second reinforcing projection of the first reinforcing rib into the first alignment slot or the first spacing slot of each of the plurality of stack components.

In another aspect of the method of assembling the fuel cell stack, the plurality of stack components are compressed and secured together in the assembly position.

A fuel cell stack is also provided. The fuel cell stack includes a plurality of stack components arranged relative to each other in an assembly position, and secured together. Each of the plurality of stack components includes a first edge defining a first alignment slot having a shape, and a first spacing slot having a shape. A first reinforcing rib includes a first reinforcing projection having a shape, and a second reinforcing projection having a shape. The shape of the first reinforcing projection and the shape of the second reinforcing projection of the first reinforcing rib are substantially identical to each other, and are complimentary to the shape of the first alignment slot. The shape of the first spacing slot of each of the plurality of stack components is larger than the shape of the first reinforcing projection and the shape of the second reinforcing projection of the first reinforcing rib. The larger shape of the first spacing slot provides an air-gap between the one of the first reinforcing projection and the second reinforcing projection of the first reinforcing rib disposed within the first spacing slot of each of the plurality of stack components.

In one aspect of the fuel cell stack, the plurality of stack components are arranged in an alternating sequence, such that the first alignment slots of adjacent stack components alternate between engagement within the first reinforcing projection and engagement within the second reinforcing projection of the first reinforcing rib.

In another aspect of the fuel cell stack, the first alignment slot and the first spacing slot are each recessed into the first edge of each of the plurality of stack components a respective depth extending perpendicular to the first edge. The depth of the first spacing slot is greater than the depth of the first alignment slot. In another aspect of the fuel cell stack, the first alignment slot and the first spacing slot each include a respective width extending parallel with the first edge. The width of the first spacing slot is greater than the width of the first alignment slot.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 2 is a schematic perspective view of an alignment system for aligning a plurality of stack components of the fuel cell stack.

FIG. 3 is a schematic plan view of a first alignment system.

DETAILED DESCRIPTION

Those having ordinary skill in the art will recognize that terms such as "above," "below," "upward," "downward,"

"top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
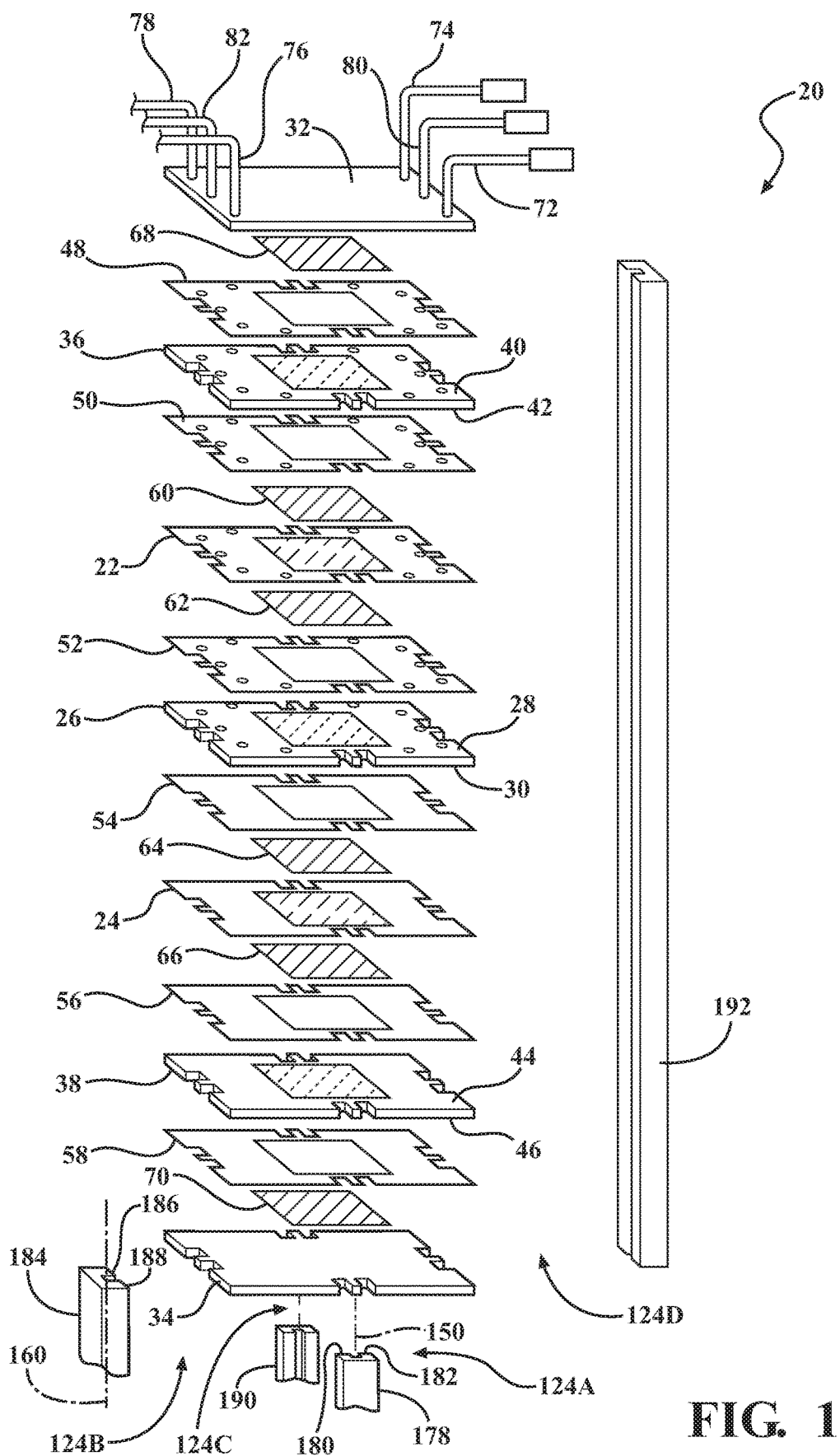
FIG. 1 is a schematic exploded perspective view of an exemplary fuel cell stack.

Referring to the FIGS., wherein like numerals indicate like parts throughout the several views, an exemplary embodiment of a fuel cell stack is generally shown at 20 in FIG. 1. Referring to FIG. 1, two individual Proton Exchange Membrane (PEM) fuel cells are connected to form the fuel cell stack 20. The fuel cell stack 20 includes a pair of Membrane Electrode Assemblies (MEAs) 22, 24, separated from each other by an electrically conductive, liquid-cooled, bipolar conductive element separator 26. The MEAs 22, 24 form the active area of each fuel cell stack 20. An individual fuel cell, which is not connected in series within a stack, has a separator plate with a single electrically active side. In the fuel cell stack 20, the bipolar separator plate 26 typically has two electrically active sides 28, 30 within the fuel cell stack 20, with each active side 28, 30 respectively facing a separate MEA 22, 24 with opposite charges that are separated, hence the so-called "bipolar" plate.

The MEAs 22, 24 and the bipolar plate 26 are stacked together between stainless steel clamping terminal plates 32, 34 and end contact fluid distribution elements 36, 38. The end contact fluid distribution elements 36, 38 include faces 40, 42 and faces 44, 46 respectively. The end fluid distribution elements 36, 38, as well as both working faces or sides 28, 30 of the bipolar plate 26 contain a plurality of lands adjacent to grooves or channels on the active faces 42, 28 and on the active faces 30, 44, which form flow fields for distributing anode and cathode reactants (i.e., $H_2$ and $O_2$/air) to the MEAs 22, 24. Faces 40, 46 of the respective end fluid distribution elements 36, 38 also contain a plurality of lands adjacent to grooves or channels but are non-active and do not have fluids flowing therethrough. Nonconductive gaskets or seals 48, 50, 52, 54, 56, 58 provide seals and electrical insulation between the several components of the fuel cell stack 20. Gas-permeable conductive diffusion media 60, 62, 64, 66 press up against the electrode faces of the MEAs 22, 24. Additional layers of conductive media 68, 70 are placed between the end contact fluid distribution elements 36, 38 and the terminal collector plates 32, 34 to provide a conductive pathway therebetween when the fuel cell stack 20 is compressed during normal operating conditions. The end contact fluid distribution elements 36, 38 press up against the diffusion media 60, 68 and the diffusion media 66, 70 respectively. Alternatively, a modified unitized assembly including diffusion media layers in sealing members bundled together as a single component can be used.

Anode reactant in the form of $H_2$ is supplied to the anode flow fields of the fuel cell stack 20 from a storage tank, a methanol or gasoline reformer, or the like, via appropriate supply plumbing 72. Similarly, cathode reactant in the form of $O_2$/air is supplied to the cathode flow fields of the fuel cell stack 20 from a storage tank or from the ambient via appropriate supply plumbing 74. Exhaust plumbing 76, 78 for the anode and cathode effluents produced in the respective anode and cathode flow fields of the fuel cell stack 20 are also provided. Additional supply plumbing 80 is provided for circulating coolant through the bipolar separator plate 26 and fluid distribution elements 36, 38 and out exit plumbing 82. Supply and exit or exhaust plumbing 72, 74, 76, 78, 80, 82 may take the form of headers within the fuel cell stack 20.

The components of the fuel cell stack 20, described above in the exemplary embodiment, should be precisely positioned relative to each other during assembly. As used here, the term "stack components 122" may include, but is not limited to, one or more of the components of the fuel cell stack 20 described above with reference to FIG. 1. Referring to FIGS. 2 and 3, an alignment system is generally shown at 124A, 124B, 124C, 124D. The alignment system 124A, 124B, 124C, 124D may be used to assembly the plurality of stack components 122 into the fuel cell stack 20. As shown in the exemplary embodiment, the fuel cell stack 20 includes a first alignment system 124A, a second alignment system 124B, a third alignment system 124C, and a fourth alignment system 124D. The detailed description of the first alignment system 124A below is applicable to all of the alignment systems 124A, 124B, 124C, 124D of the stack.

In the exemplary embodiment of the fuel cell stack 20 described herein, each of the plurality of stack components 122 includes a respective first edge 126, a respective second edge 128, a respective third edge 130, and a respective fourth edge 132. The first alignment system 124A is disposed on the first edge 126, the second alignment system 124B is disposed on the second edge 128, the third alignment system 124C is disposed on the third edge 130, and the fourth alignment system 124D is disposed on the fourth edge 132. While the exemplary embodiment described herein and shown in the Figures includes four edges, with each edge having a respective alignment system, it should be appreciated that other embodiments may be configured differently than the exemplary embodiment, and may include more than or less than the four alignment systems of the exemplary embodiment shown.

Figure 4:
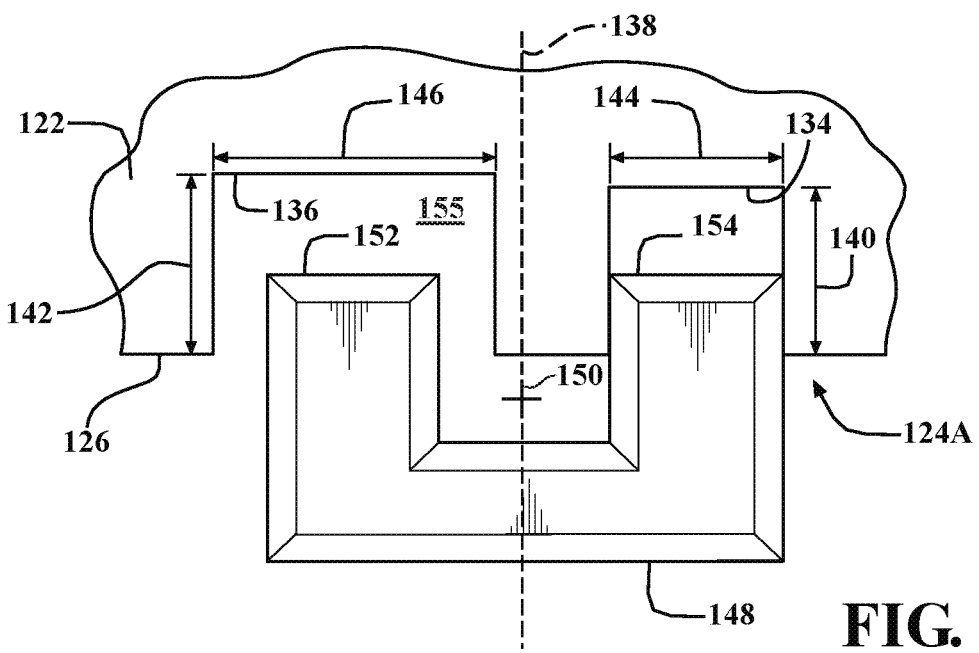
FIG. 4 is an enlarged schematic partial plan view of the alignment system.

Referring to FIG. 4, the first alignment system 124A includes each of the stack components 122 defining a first alignment slot 134 in their respective first edge 126. The first alignment slot 134 includes a respective shape. Optionally, the first edge 126 of each of the plurality of stack components 122 may further define a first spacing slot 136 having a respective shape. The first spacing slot 136 is laterally offset across a first centerline 138 from the first alignment slot 134.

The first alignment slot 134 and the first spacing slot 136 of each one of the stack components 122 are each recessed into their respective first edge 126 of the plurality of stack components 122 a respective depth 140, 142. The depth 140 of the first alignment slot 134 and the depth 142 of the first spacing slot 136 extend perpendicular to the first edge 126 to a respective bottom. The depth 142 of the first spacing slot 136 is greater than the depth 140 of the first alignment slot 134. For example, the depth 142 of the first spacing slot 136 may be between 1.00 mm and 2.00 mm greater than the depth 140 of the first alignment slot 134. The first alignment slot 134 and the first spacing slot 136 of each of the stack components 122 each include a respective width 144, 146 extending parallel with the first edge 126. The width 146 of the first spacing slot 136 is greater than the width 144 of the first alignment slot 134 of each respective one of the stack components 122. For example, the width 146 of the first spacing slot 136 may be between 2.00 mm and 3.00 mm greater than the width 144 of the first alignment slot 134.

The first alignment system 124A further includes a first alignment guide bar 148. It should be appreciated that the first alignment guide bar 148 and the stack components 122 may be supported by a rack or other machine (not shown).

The first alignment guide bar 148 extends along a longitudinal axis 150, and includes a first alignment portion 152 having a respective shape, and a second alignment portion 154 having a respective shape. The second alignment portion 154 of the first alignment guide bar 148 is laterally offset across the first centerline 138 from the first alignment portion 152 of the first alignment guide bar 148. In the exemplary embodiment shown in the figures and described herein, the first alignment portion 152 and the second alignment portion 154 are spaced an equal distance from the first centerline 138. The shape of the second alignment portion 154 is substantially identical to the shape of the first alignment portion 152. As used herein, the phrase "substantially identical" is defined as the same, with minor deviations of size, shape, and/or dimension due to varying manufacturing tolerances.

The shape of the first alignment portion 152 and the second alignment portion 154 of the first alignment guide bar 148 is complimentary to the shape of the first alignment slot 134 of each of the plurality of stack components 122. As used herein, "complimentary shapes" are shapes that have a similar size and configuration, but that allow one component to easily fit or nest within the other component with minimal free movement therebetween. One of the first alignment portion 152 and the second alignment portion 154 of the first alignment guide bar 148 is disposed within the first alignment slot 134 of each of the stack components 122. As such, abutting engagement between one of the first alignment portion 152 or the second alignment portion 154 of the first alignment guide bar 148, and the first alignment slot 134, aligns each respective stack component 122 relative to the first alignment guide bar 148 in a respective assembly position relative to the other of the plurality of stack components 122.

The other of the first alignment portion 152 and the second alignment portion 154 of the first alignment guide bar 148, i.e., the one not disposed within the first alignment slot 134, is disposed within the first spacing slot 136 in non-contacting engagement to provide an insulation air-gap 155 therebetween. The shape of the first spacing slot 136 of each of the stack components 122 is larger than the shape of the first alignment portion 152 and the shape of the second alignment portion 154 of the first alignment guide bar 148. The larger size of the first spacing slot 136 relative to the first alignment portion 152 and the second alignment portion 154 provides the gap 155 between each respective one of the plurality of stack components 122 and the one of the first alignment portion 152 and the second alignment portion 154 of the first alignment guide bar 148 disposed within the first spacing slot 136.

Figure 5:
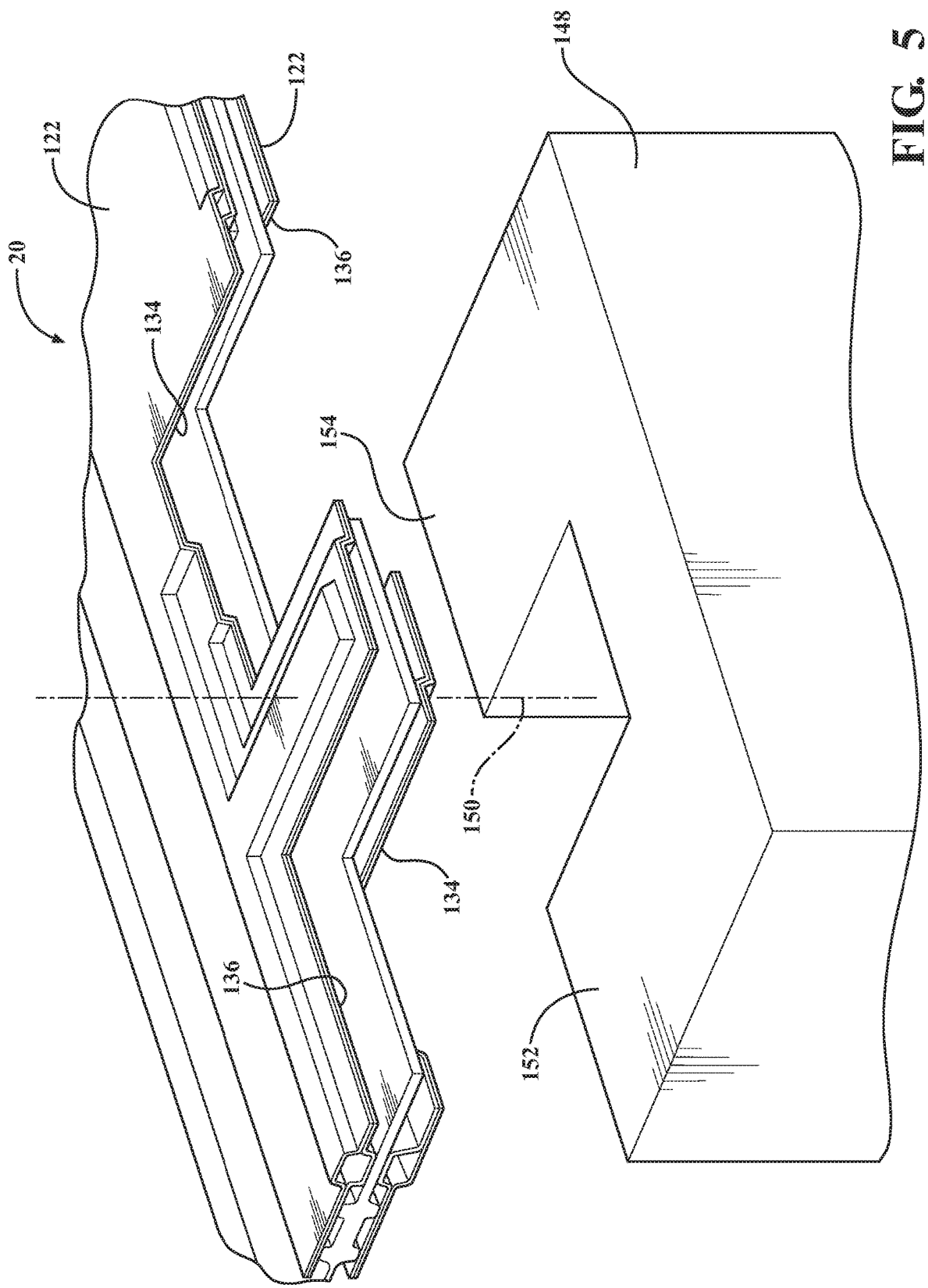
FIG. 5 is an enlarged schematic partial perspective view of the alignment system.

Referring to FIG. 5, in the exemplary embodiment described herein, the stack components 122 are arranged in an alternating sequence such that the first alignment slots 134 of adjacent stack components 122 alternate between engagement within the first alignment portion 152 and engagement within the second alignment portion 154 of the first alignment guide bar 148. As such, the first alignment slot 134 of one stack component is engaged with the first alignment portion 152 of the first alignment guide bar 148, while the first spacing slot 136 of that stack component 122 is engaged with the second alignment portion 154 of the first alignment guide bar 148. The first alignment slot 134 of an adjacent stack component 122 is engaged with the second alignment portion 154 of the first alignment guide bar 148, while the first spacing slot 136 of the adjacent stack component 122 is engaged with the first alignment portion 152. This alternating sequence may be continued throughout the stack components 122 of the fuel cell stack 20. The symmetrical shape of the first alignment portion 152 and the second alignment portion 154 across the first centerline 138 enables this alternating sequence. It should be appreciated that the stack components 122 may be rotated, flipped, or otherwise specifically constructed so that their respective first alignment slot 134 and first spacing slot 136 of adjacent stack components 122 alternate between engagement between the first alignment portion 152 and the second alignment portion 154 of the first alignment guide bar 148.

As noted above, the stack components 122 of the fuel cell stack 20 include the second alignment system 124B disposed on the second edge 128, the third alignment system 124C disposed on the third edge 130, and the fourth alignment system 124D disposed on the fourth edge 132. It should be appreciated that the respective alignment systems may be disposed on generally opposing edges in a generally parallel relationship relative to each other, such as the first alignment system 124A and the third alignment system 124C, or may be disposed on generally adjacent edges in a generally perpendicular relationship relative to each other, such as the first alignment system 124A and the second alignment system 124B. Additionally, the fuel cell stack 20 may include multiple alignment systems, such as shown in the exemplary embodiment, in which the alignment systems include are arranged in pairs that are disposed in a generally parallel relationship, and with each pair disposed in a generally perpendicular relationship. Furthermore, it should be appreciated that the fuel cell stack 20 may only include a single alignment system.

Figure 6:
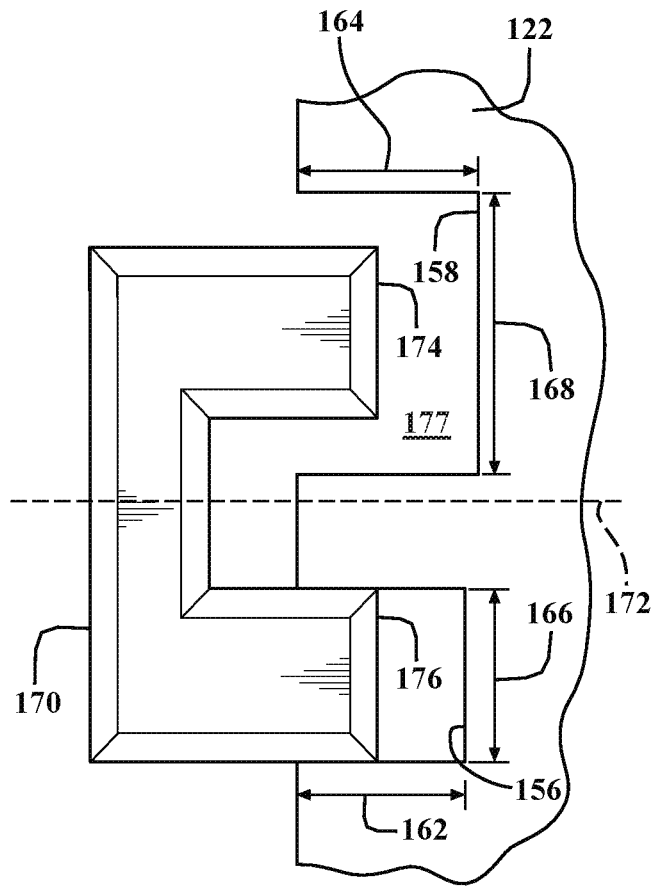
FIG. 6 is a schematic plan view of a second alignment system.

Referring to FIG. 6, the second alignment system 124B includes each of the plurality of stack components 122 defining a second alignment slot 156 in their respective second edge 128. The second alignment slot 156 includes a respective shape. Optionally, the second edge 128 of each of the plurality of stack components 122 may further define a second spacing slot 158 having a respective shape. The second spacing slot 158 is laterally offset across a second centerline 160 from the second alignment slot 156.

The second alignment slot 156 and the second spacing slot 158 of each one of the stack components 122 are each recessed into their respective second edge 128 of the plurality of stack components 122 a respective depth 162, 164. The depth 162 of the second alignment slot 156 and depth 164 of the second spacing slot 158 extend perpendicular to the second edge 128 to a respective bottom. The depth 164 of the second spacing slot 158 is greater than the depth 162 of the second alignment slot 156. The second alignment slot 156 and the second spacing slot 158 of each of the stack components 122 each include a respective width 166, 168 extending parallel with the second edge 128. The width 168 of the second spacing slot 158 is greater than the width 166 of the second alignment slot 156 of each respective one of the stack components 122.

The second alignment system 124B further includes a second alignment guide bar 170. It should be appreciated that the second alignment guide bar 170 and the stack components 122 may be supported by a rack or other machine (not shown). The second alignment guide bar 170 extends along a longitudinal axis 172, and includes a first alignment portion 174 having a respective shape, and a second alignment portion 176 having a respective shape. The second alignment portion 176 of the second alignment guide bar 170 is laterally offset across the second centerline 160 from the first alignment portion 174 of the second alignment guide bar 170. In the exemplary embodiment described herein, the first alignment portion 174 and the second alignment portion 176 are spaced an equal distance from the second centerline 160. The shape of the second alignment portion 176 is substantially identical to the shape of the first alignment portion 174.

The shape of the first alignment portion 174 and the second alignment portion 176 of the second alignment guide bar 170 is complimentary to the shape of the second alignment slot 156 of each of the plurality of stack components 122. One of the first alignment portion 174 and the second alignment portion 176 of the second alignment guide bar 170 is disposed within the second alignment slot 156 of each of the stack components 122. As such, abutting engagement between one of the first alignment portion 174 or the second alignment portion 176 of the second alignment guide bar 170, and the second alignment slot 156, aligns each respective stack component relative to the second alignment guide bar 170 in a respective assembly position relative to the other of the plurality of stack components 122.

The other of the first alignment portion 174 and the second alignment portion 176 of the second alignment guide bar 170, i.e., the one not disposed within the second alignment slot 156, is disposed within the second spacing slot 158 in non-contacting engagement to provide an insulation airgap 177 therebetween. The shape of the second spacing slot 158 of each of the stack components 122 is larger than the shape of the first alignment portion 174 and the shape of the second alignment portion 176 of the second alignment guide bar 170. The larger size of the second spacing slot 158 relative to the first alignment portion 174 and the second alignment portion 176 provides the gap 177 between each respective one of the plurality of stack components 122 and the one of the first alignment portion 174 and the second alignment portion 176 of the second alignment guide bar 170 disposed within the first spacing slot 136.

In the exemplary embodiment described herein, the stack components 122 are arranged in an alternating sequence such that the second alignment slots 156 of adjacent stack components 122 alternate between engagement within the first alignment portion 174 and engagement within the second alignment portion 176 of the second alignment guide bar 170. As such, the second alignment slot 156 of one stack component 122 is engaged with the first alignment portion 174 of the second alignment guide bar 170, while the second spacing slot 158 of that stack component 122 is engaged with the second alignment portion 176 of the second alignment guide bar 170. The second alignment slot 156 of an adjacent stack component 122 is engaged with the second alignment portion 176 of the second alignment guide bar 170, while the second spacing slot 158 of the adjacent stack component 122 is engaged with the first alignment portion 174 of the second alignment guide bar 170. This alternating sequence may be continued throughout the stack components 122 of the fuel cell stack 20. The symmetrical shape of the first alignment portion 174 and the second alignment portion 176 across the second centerline 160 enables this alternating sequence. It should be appreciated that the stack components 122 may be rotated, flipped, or otherwise specifically constructed so that their respective second alignment slot 156 and second spacing slot 158 of adjacent stack components 122 alternate between engagement between the first alignment portion 174 and the second alignment portion 176 of the second alignment guide bar 170.

A method of assembling the fuel cell stack 20 is also provided. The method includes providing the plurality of stack components 122 as described above. For example, the stack components 122 are provided such that each of the stack components 122 includes the first edge 126 defining the first alignment slot 134 and the first spacing slot 136. Additionally, it should be appreciated that the stack components 122 may also be provided with the second edge 128 defining the second alignment slot 156 and the second spacing slot 158. The additional edges of the stack components 122 may likewise be provided with respective alignment slots and spacing slots.

One of the first alignment portion 152 or the second alignment portion 154 of the first alignment guide bar 148 is positioned within the first alignment slot 134 of each of the plurality of stack components 122. The other of the first alignment portion 152 and the second alignment portion 154 of the first alignment guide bar 148 is positioned within the first spacing slot 136. Similarly, one of the first alignment portion 174 or the second alignment portion 176 of the second alignment guide bar 170 is positioned within the second alignment slot 156 of each of the plurality of stack components 122. The other of the first alignment portion 174 and the second alignment portion 176 of the second alignment guide bar 170 is positioned within the second spacing slot 158. This process may be repeated for the third alignment system 124C and the fourth alignment system 124D as well.

As noted above, the shape of the first alignment portion 152 and the second alignment portion 154 of the first alignment guide bar 148 is complimentary to the shape of the first alignment slot 134 of each of the plurality of stack components 122, such that abutting engagement between the one of the first alignment portion 152 or the second alignment portion 154 of the first alignment guide bar 148 and the first alignment slot 134 aligns each respective stack component 122 in a respective assembly position relative to the other of the stack components 122 to form the fuel cell stack 20. Similarly, the shape of the first alignment portion 174 and the second alignment portion 176 of the second alignment guide bar 170 is complimentary to the shape of the second alignment slot 156 of each of the plurality of stack components 122, such that abutting engagement between the one of the first alignment portion 174 or the second alignment portion 176 of the second alignment guide bar 170 and the second alignment slot 156 aligns each respective stack component 122 in their respective assembly position relative to the other of the stack components 122 to form the fuel cell stack 20. The third alignment system 124C and the fourth alignment system 124D operate in the same manner.

Once the stack components 122 have been arranged and/or positioned relative to each other in the assembly position, the stack components 122 may be compressed together, and the first alignment guide bar 148 may be removed from the fuel cell stack 20. Similarly, the second alignment guide bar 170 is removed from the fuel cell stack 20 as well. The respective guide bars from the third alignment system 124C and the fourth alignment system 124D are removed as well.

A potting compound may be installed into the first alignment slot 134 and the first spacing slot 136 of each of the plurality of stack components 122. Similarly, the potting compound may be installed in the second alignment slot 156 and the second spacing slot 158 of each of the stack components 122. As understood by those skilled in the art, the potting compound is a solid or gelatinous compound used for resistance to shock and vibration, and for the exclusion of moisture and corrosive agents. Exemplary potting compounds may include, but are not limited to, thermosetting plastics or silicone rubber gels.

A first reinforcing rib 178 may then be secured to the fuel cell stack 20. The first reinforcing rib 178 includes a first reinforcing projection 180, and a second reinforcing projection 182. One of the first reinforcing projection 180 or the second reinforcing projection 182 of the first reinforcing rib 178 may then be positioned into the first alignment slot 134 of each of the plurality of stack components 122. Similarly, one of a first reinforcing projection 186 or a second reinforcing projection 188 of a second reinforcing rib 184 may then be positioned into the second alignment slot 156 of each of the plurality of stack components 122. The stack components 122 may then be secured together in a manner understood by those skilled in the art. The first reinforcing rib 178 and the second reinforcing rib 184 help retain the stack components 122 in their respective positions in response to an impact.

Referring to FIG. 1, the process described above may be used to assembly the fuel cell stack 20. As described above, the stack components 122 include the first edge 126 defining the first alignment slot 134 having its respective shape, and the first spacing slot 136 having its respective shape. Additionally, the stack components 122 may further include the second edge 128 defining the second alignment slot 156 having its respective shape, and the second spacing slot 158 having its respective shape. The third edge 130 and the fourth edge 132 of the stack components 122 may similarly include a respective alignment slot and a respective spacing slot for the respective third alignment system 124C and fourth alignment system 124D disposed thereon.

As described above, the first alignment slot 134 and the first spacing slot 136 are each recessed into the first edge 126 of each of the plurality of stack components 122 their respective depth 140, 142 extending perpendicular to the first edge 126. The depth 142 of the first spacing slot 136 is greater than the depth 140 of the first alignment slot 134. Additionally, the first alignment slot 134 and the first spacing slot 136 each include their respective width 144, 146 extending parallel with the first edge 126. The width 146 of the first spacing slot 136 is greater than the width 144 of the first alignment slot 134. The alignment slots and the spacing slots of the other alignment systems, i.e., the second alignment system 124B, the third alignment system 124C, and the fourth alignment system 124D may be similarly configured.

The first reinforcing rib 178 is secured to the stack components 122. As noted above, the first reinforcing rib 178 includes the first reinforcing projection 180 having its respective shape, and the second reinforcing projection 182 having its respective shape. The shape of the first reinforcing projection 180 and the shape of the second reinforcing projection 182 of the first reinforcing rib 178 are substantially identical to each other, and are complimentary to the shape of the first alignment slot 134. The shape of the first spacing slot 136 of each of the plurality of stack components 122 is larger than the shape of the first reinforcing projection 180 and the shape of the second reinforcing projection 182 of the first reinforcing rib 178 to provide an air-gap between the first reinforcing rib 178 and the first spacing slot 136 of each of the plurality of stack components 122. The fuel cell stack 20 may further include the second reinforcing rib 184 disposed within the second alignment slot 156 of the second alignment system 124B. In a similar manner, a third reinforcing rib 190 and a fourth reinforcing rib 192 may be positioned within the respective alignment slots of the third alignment system 124C and the fourth alignment system 124D. The stack components 122 may be arranged in an alternating sequence, such that the first alignment slots 134 of adjacent stack components 122 alternate between engagement within the first reinforcing projection 180 and engagement within the second reinforcing projection 182 of the first reinforcing rib 178.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A fuel cell stack alignment system comprising:
a plurality of stack components, with each of the plurality of stack components defining a planar surface having a centerline, the planar surface including a periphery having a first edge, the first edge including a first alignment slot and a first spacing slot, the first alignment slot being adjacent to the first spacing slot, the first alignment slot having an alignment shape, and the first spacing slot having a spacing shape that is different than the alignment shape;
a first alignment guide bar having a first alignment portion and a second alignment portion each having a guide shape; and
wherein the guide shape is complimentary to the alignment shape such that an abutting engagement between the first alignment portion or the second alignment portion of the first alignment guide bar and the first alignment slot of each respective stack component aligns the respective stack component in a respective assembly position among the plurality of stack components, the guide shape is different than the spacing shape such that the abutting engagement creates a gap inside the first spacing slot between the first alignment guide bar and the respective stack component and the plurality of stack components are arranged in an alternating sequence such that the first alignment slots are aligned with the first spacing slots of adjacent stack components.

2. The fuel cell stack alignment system set forth in claim 1, wherein within each of the plurality of stack components, a distance along the periphery from a first center of the first alignment slot to the centerline matches that from a second center of the first spacing slot to the centerline.

3. The fuel cell stack alignment system set forth in claim 1, wherein the first alignment portion and the second alignment portion are parallel to each other.

4. The fuel cell stack alignment system set forth in claim 1, wherein the spacing shape is larger than the guide shape such that the gap extends around the guide shape while disposed inside the first spacing slot of the respective stack component.

5. The fuel cell stack alignment system set forth in claim 2, wherein within each of the plurality of stack components, a third center of the first alignment portion and a fourth center of the second alignment portion are separated by twice the distance from the first center of the first alignment slot to the centerline.

6. The fuel cell stack alignment system set forth in claim 1, wherein the plurality of stack components are arranged in the alternating sequence such that the first alignment slots of the adjacent stack components alternate between engagement with the first alignment portion of the first alignment guide bar and engagement with the second alignment portion of the first alignment guide bar.

7. The fuel cell stack alignment system set forth in claim 1, wherein:

the periphery of each of the plurality of stack components includes a second edge, the second edge including a second alignment slot and a second spacing slot, the second alignment slot being adjacent to the second spacing slot, the second alignment slot having the alignment shape, and the second spacing slot having the spacing shape;

a second alignment guide bar having a third alignment portion and a fourth alignment portion each having the guide shape; and an additional abutting engagement between the third alignment portion or the fourth alignment portion and the second alignment slot of each respective stack component aligns the respective stack component in the respective assembly position among the plurality of stack components.

8. The fuel cell stack alignment system set forth in claim 7, wherein within each of the plurality of stack components, the spacing shape of the second spacing slot is larger than the guide shape to provide the gap inside the second spacing slot between the second alignment guide bar and the respective stack component.

9. The fuel cell stack alignment system set forth in claim 8, wherein the first edge and the second edge of each respective one of the stack components are opposing edges of the periphery that are parallel with each other.

10. The fuel cell stack alignment system set forth in claim 8, wherein the first edge and the second edge of each respective one of the stack components are adjacent edges of the periphery that are perpendicular to each other.

11. The fuel cell stack alignment system set forth in claim 1, wherein within each of the plurality of stack components, the first alignment slot and the first spacing slot are each recessed into the first edge a respective depth extending perpendicular to the first edge, with the respective depth of the first spacing slot being greater than the respective depth of the first alignment slot.

12. The fuel cell stack alignment system set forth in claim 1, wherein within each of the plurality of stack components, the first alignment slot and the first spacing slot each include a respective width extending parallel with the first edge, with the respective width of the first spacing slot being greater than the respective width of the first alignment slot.

13. A method of assembling a fuel cell stack, the method comprising:

providing a plurality of stack components, with each of the plurality of stack components defining a planar surface having a centerline, the planar surface including a periphery having a first edge, the first edge including a first alignment slot and a first spacing slot, the first alignment slot being adjacent to the first spacing slot, the first alignment slot having an alignment shape, and the first spacing slot having a spacing shape that is different than the alignment shape;

positioning a first alignment portion and a second alignment portion of a first alignment guide bar within the first alignment slot and the first spacing slot of each of the plurality of stack components, with the first alignment portion and the second alignment portion each having a guide shape; and wherein the guide shape is complimentary to the alignment shape such that an abutting engagement between the first alignment portion or the second alignment portion of the first alignment guide bar and the first alignment slot of each respective stack component aligns the respective stack component in a respective assembly position among the plurality of stack components to form the fuel cell stack, the guide shape is different than the spacing shape such that the abutting engagement creates a gap inside the first spacing slot between the first alignment guide bar and the respective stack component, and the plurality of stack components are arranged in an alternating sequence such that the first alignment slots are aligned with the first spacing slots of adjacent stack components.

14. The method set forth in claim 13, further comprising:
removing the first alignment guide bar from the fuel cell stack after the plurality of stack components are positioned in the assembly position.

15. The method set forth in claim 14, further comprising;
positioning a first reinforcing projection and a second reinforcing projection of a first reinforcing rib into the first alignment slot and the first spacing slot of each of the plurality of stack components to secure the fuel cell stack after assembly.

16. The method set forth in claim 15, further comprising:
installing a potting compound into the first alignment slot and the first spacing slot of each of the plurality of stack components.

17. The method set forth in claim 13, further comprising:
securing the plurality of stack components together.

18. A fuel cell stack comprising:

a plurality of stack components arranged relative to each other in an assembly position;

wherein each of the plurality of stack components defines a planar surface having a centerline, the planar surface includes a periphery having a first edge, the first edge includes a first alignment slot and a first spacing slot, the first alignment having an alignment shape, and the first spacing slot having a spacing shape that is different than the alignment shape;

a first reinforcing rib having a first reinforcing projection and a second reinforcing projection each having a guide shape, with the first reinforcing rib securing the plurality of stack components together; and wherein the guide shape of the first reinforcing projection and the second reinforcing projection of the first reinforcing rib are complimentary to the alignment shape of the first alignment slot such that an abutting engagement between the first reinforcing projection or the second reinforcing projection of the first reinforcing rib and the first alignment slot of each respective stack component maintains the alignment of each respective stack component in the assembly position among the plurality of stack components, the guide shape is different than the spacing shape such that the abutting engagement creates a gap inside the first spacing slot between the first reinforcing rib and the respective stack component, and the plurality of stack components are arranged in an alternating sequence such that the first alignment slots are aligned with the first spacing slots of adjacent stack components.

19. The fuel cell stack set forth in claim 18, wherein the plurality of stack components are arranged in the alternating sequence such that the first alignment slots of the adjacent stack components alternate between the abutting engagement within the first reinforcing projection and engagement within the second reinforcing projection of the first reinforcing rib.

20. The fuel cell stack set forth in claim 18, wherein within each of the plurality of stack components:

the first alignment slot and the first spacing slot are each recessed into the first edge of a respective depth extending perpendicular to the first edge, with the respective depth of the first spacing slot greater than the respective depth of the first alignment slot; and the first alignment slot and the first spacing slot each include a respective width extending parallel with the first edge, with the respective width of the first spacing slot being greater than the respective width of the first alignment slot.

\* \* \* \* \*